UNITED STATES PATENT OFFICE.

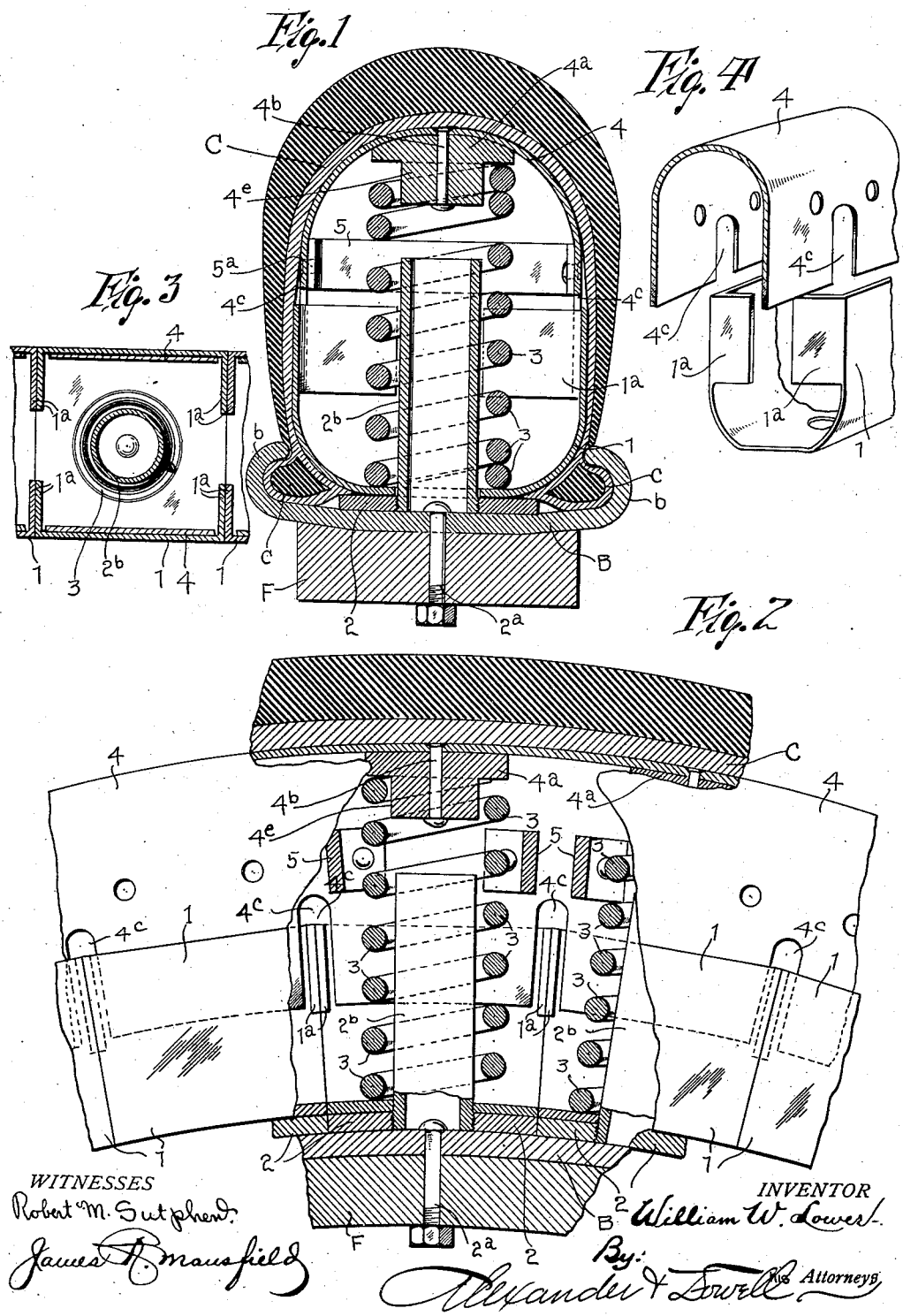

WILLIAM W. LOWER, OF TYRONE, PENNSYLVANIA.

SPRING-CUSHIONED TIRE FOR VEHICLE-WHEELS.

1,025,072.     Specification of Letters Patent.     Patented Apr. 30, 1912.

Application filed January 2, 1912. Serial No. 669,045.

*To all whom it may concern:*

Be it known that I, WILLIAM W. LOWER, of Tyrone, in the county of Blair and State of Pennsylvania, have invented certain new and useful Improvements in Spring-Cushioned Tires for Vehicle-Wheels; and I hereby declare that the following is a full, clear, and exact description thereof, reference being had to the accompanying drawings, which form part of this specification.

This invention is a novel spring cushioned tire for vehicle wheels, being especially designed for automobile wheel tires; and in particular it is an improvement upon the tire shown in my Patent No. 1,010,061 dated November 28, 1911.

The objects of the present invention are to simplify the construction of such tire; increase its efficiency; prevent breaking of the springs under excessive load; prevent excessive side thrust on the springs; and increase the resistance of the tire to lateral thrust when the vehicle is turning.

A tire constructed in accordance with this invention will be resilient like a pneumatic tire; will be puncture proof; and will not be affected by climatic changes.

I will explain the invention more fully with reference to the accompanying drawings which illustrate a portion of a tire constructed in accordance with the invention, and will suffice to enable other to construct and use same.

In the drawings: Figure 1 is a transverse section through the cushion tire as applied to a vehicle wheel. Fig. 2 is a part side view and part longitudinal sectional view of the cushion tire. Fig. 3 is a detail horizontal section. Fig. 4 is a detail sectional perspective view of part of the rim and part of one of the U-shaped members.

My improved tire consists of a series of equi-distant U-shaped semi-cylindric spring members 1 which are arranged transversely of the felly F of the wheel, and are preferably attached to or supported on an annular metal band 2 which encircles the felly F and may be secured thereto by bolts $2^a$ or other suitable means. The members 1 are arranged radially in an annular series extending entirely around the wheel, and are disposed transversely of the band 2 as shown. Each member 1 is preferably provided with inwardly projecting side fingers or flanges $1^a$; which flanges $1^a$ abut against the like flanges on the adjacent members so that the members support each other against thrust in a direction circumferentially of the wheel. The flanges $1^a$ also prevent the members catching each other at their meeting or adjacent edges when being flexed.

Attached to the band 2 and projecting radially therefrom within each member 1 is a preferably tubular stud $2^b$ which may be formed of a piece of tubing screwed into a suitable opening in the band 2. Each stud $2^b$ passes through an opening in a member 1; and such member can be slipped over the stud into position. Surrounding each stud is a helical expansion spring 3 which projects above the stud, the lower end of said spring being retained in position by the stud while the upper end of the spring is engaged and retained in position by a cap piece $4^a$ which is secured— preferably by a rivet $4^b$—to the outer cylindric semi-tubular rim 4. This rim 4 forms the tread portion of the tire and while it may be made as in my said patent is preferably made in one continuous piece and is U-shaped in cross section. And the sides of this rim may be notched as at $4^c$ so as to enable them to be inserted between the sides of the members 1, while the plates or flanges $1^a$ extend inwardly through the slots $4^c$. This construction enables the rim 4 to partially telescope with the members 1; and the engaging slots and flanges also cause the rim to turn with the members 1 as the wheel rotates; and prevent the rim moving circumferentially of the wheel relative to the members 1.

The rim 4 may be braced intermediate each pair of springs by transverse tie rods or plates 5, which may be attached to the sides of the rim by rivets $5^a$, or in other suitable manner. The caps $4^a$ are preferably provided with short depending portions $4^e$ which engage the upper ends of the springs as shown and keep the latter in position. If the tire is subjected to undue or excessive compression caps $4^a$ would seat upon the tubular studs $2^b$ and prevent breaking of the springs.

If desired the spring-cushioned tire thus formed, may be covered or inclosed within a tube or casing C that may be provided with flanges $c$ adapted to engage flanges $b$ on the outer end of the plate B, as indicated in Fig. 1, and as described in my aforesaid patent; but the construction of this outer casing and the mode of attaching same to the wheel forms no part of the present invention and is not claimed herein.

By this invention the tire is cushioned principally by the springs 3, which may be made of any strength desired according to the use for which the wheel is designed. The construction is simple and the parts can be assembled more readily, and there are fewer parts to handle, than in the tire shown in my aforesaid patent.

If the rim is made in sections, as in my said patent, when the wheel passes over a stone or any object in the road, only that part of the rim on which the pressure comes will move inward, as in a pneumatic tire, as one or more sections of the rim will give while the others remain in position. But when the rim is made in one continuous piece, and the wheel passes over a stone or any object in the road, the rim being stiff will move to a position eccentric to the wheel, or the latter will move down in the rim.

What I claim is:

1. In a cushioned tire, the combination of an annular series of U-shaped members provided with inwardly projecting rubbing flanges on their adjacent edges, a semi-tubular rim surrounding the annular series of members, and provided with notches in its sides to accommodate said rubbing flanges, and cushioning devices interposed between the members and the rim intermediate the rubbing flanges.

2. In a cushioning tire, the combination of an annular series of U-shaped members provided with inwardly projecting rubbing flanges on their adjacent edges, a semi-tubular rim surrounding the annular series of members, the sides of the rim telescoping with the said members and having notches to accommodate the flanges on the members, and helical springs interposed between the members and the rim intermediate the rubbing flanges.

3. A cushion tire for vehicles, comprising a ring, a series of studs attached thereto and projecting radially therefrom, U-shaped members slipped over the studs onto the rim and provided with inwardly projecting rubbing flanges on their adjacent edges, an annular semi-tubular rim surrounding the series of members and having its sides notched to accommodate the rubbing flanges, cap plates secured within the rim opposite the studs, and helical springs strung on the studs and engaging the cap plates, substantially as described.

4. A cushion tire for vehicle wheels, comprising an annular series of closely adjacent U-shaped members, a semi-tubular rim surrounding said series and telescoping therewith, a stud projecting radially outward within each member, cap plates attached to the rim opposite the studs, and cushioning devices within the U-shaped members and surrounding the studs and engaging the cap plates.

5. A cushion tire comprising an annular series of closely adjacent U-shaped plates having inwardly projecting flanges on their adjacent edges, the flanges on adjacent sections abutting, a hollow semi-tubular rim surrounding said series of U-shaped plates and telescoping therewith, a stud projecting radially within each member, a cap plate attached to the rim opposite each stud, and helical expansion springs seated within each U-shaped member and surrounding the studs and engaging the cap plates.

6. A cushion tire for vehicles, comprising a ring, a series of studs attached to said rim and projecting outwardly and radially therefrom, a U-shaped member slipped over each stud onto the rim, the adjacent U-shaped members abutting, an annular semi-tubular rim surrounding the series of members, the sides of said rim being notched, cap plates secured within the rim oppoiste the studs and cushioning springs within the U-shaped members and strung on the studs and engaging the cap plates.

In testimony that I claim the foregoing as my own, I affix my signature in presence of two witnesses.

WILLIAM W. LOWER.

Witnesses:
D. B. MINGLE,
W. F. TAYLOR.